Patented Dec. 14, 1937

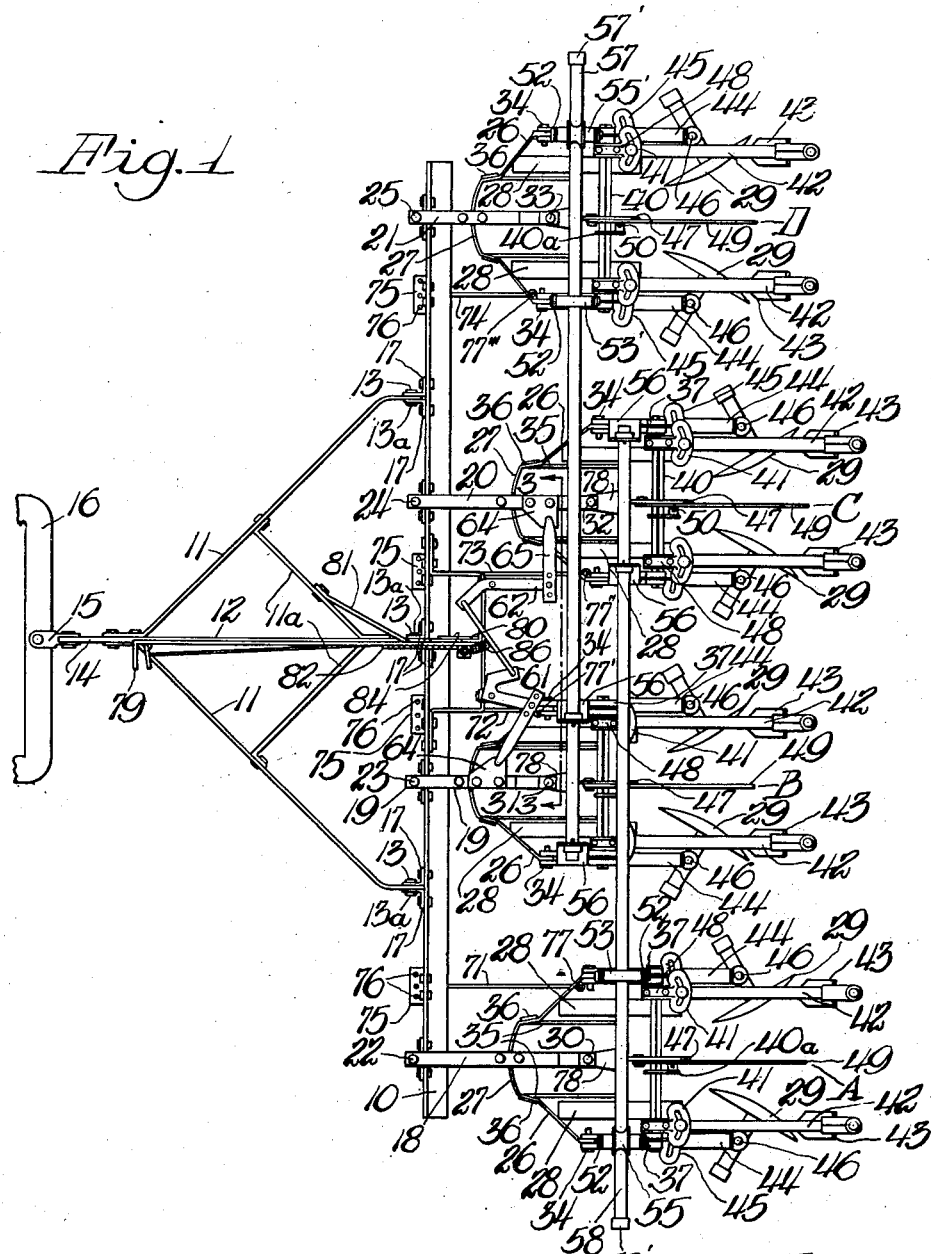

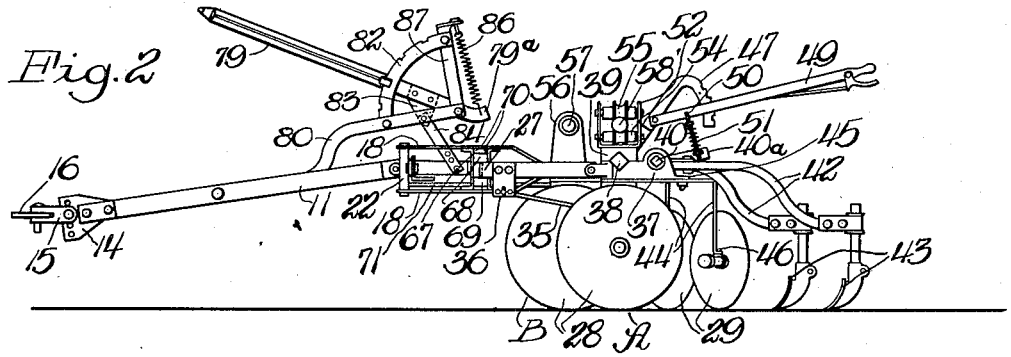
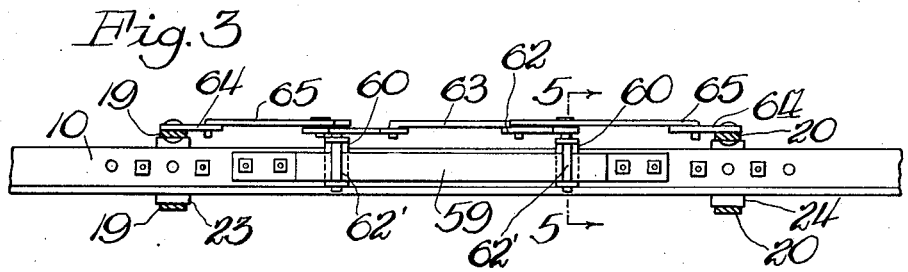
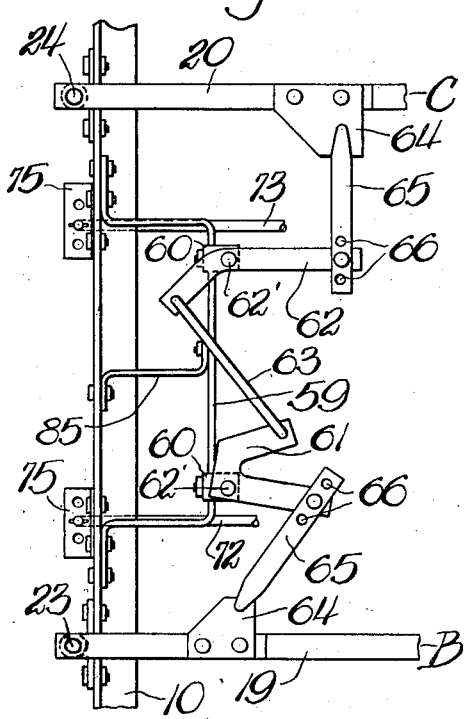
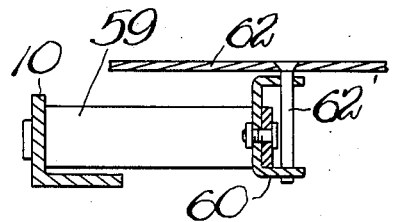

2,102,262

UNITED STATES PATENT OFFICE 2,102,262

TRACTOR LISTER CULTIVATOR

William S. Graham, Canton, Ill., assignor to International Harvester Company, a corporation of New Jersey Application January 31, 1936, Serial No. 61,827

21 Claims. (Cl. 97—143)

This invention relates to lister cultivators of the multiple unit type adapted to be drawn by tractors.

The principal object of the invention is to provide a tractor drawn multiple unit cultivator in which the several lister units will be free to follow the furrow or ridges on which they are respectively working and which are so connected to each other and to a common draft frame as to remain in upright position and in parallel relation to each other and to the line of travel of the cultivator as a whole, as they shift laterally to follow deviations in the furrows.

Another object of the invention is to construct the frame of the cultivator so that the several units are held in level or stable relationship to each other and to construct the frame and position the lister cultivator units so that clearance is provided so that on lateral shifting of each unit, the units will not interfere with each other.

Another object of the invention is to provide an equalizing mechanism to provide freedom to the cultivator units so that they can move in and out to adapt themselves to the uneven spacing of the furrows and prevent the cultivator as a whole from getting crosswise.

At the same time that these centre units are connected by equalizing means, these units are connected with alternate outer units by stabilizing means so that the transverse draft frame may be held in horizontal position. Other objects and advantages will appear in the following description of a preferred embodiment of the invention, as illustrated in the accompanying drawings, wherein:

Figure 1 is a plan view of the lister cultivator showing the frame construction and the equalizing mechanism;

Figure 2 is a side view of the tractor lister cultivator;

Figure 3 is a vertical elevation of the equalizing mechanism along lines 3—3 of Figure 1 looking in the direction of the arrows;

Figure 4 is a plan view of the equalizing mechanism; and,

Figure 5 is a vertical section through a portion of the equalizing mechanism, as shown along lines 5—5 of Figure 3, looking in the direction of the arrows.

As herein disclosed the lister cultivator embodying the invention has a draft frame comprising an elongated transverse draft bar 10 to which forwardly extending converging hitch bars 11 and a central hitch bar 12 are pivotally connected on horizontal pivots as at 13. The connected ends of the hitch bar are secured to the usual draft member 14. Adjustably connected to the draft member 14 is a clevis 15 for connecting the lister cultivator to the draw-bar 16 of the tractor. The rear ends of the hitch bars 11 and 12 are pivotally connected at 13a on the horizontal axes of the pivots 13 to the draft connecting members 17 which are secured to the transverse member. The hitch bars 11 are suitably braced to the central hitch bar 12 by the braces 11a. This flexible connection at 13 allows the hitch bars 11 and 12 and the transverse bar 10 of the lister cultivator frame to have relative vertical movement.

Pivotally connected to the transverse member 10 are the main draft tongues 18, 19, 20, and 21 of the lister cultivator units A, B, C, and D. The main draft tongues 18, 19, 20, and 21 are pivotally connected to the transverse frame member 10 at 22, 23, 24, and 25, respectively, by the draft pin and clevis portion of the draft tongues. The draft tongues or means 18, 19, 20, and 21 may be adjusted laterally on the transverse frame member by means of adjusting holes to which the pivot connections 22, 23, 24, and 25 are adjustably connected thereby. The adjustment laterally of the cultivator units A, B, C, and D may be for any width of row spacing, but preferably 38, 40, 42, and 44 inch row spacings are used. Each lister cultivator unit A, B, C, and D are of conventional type comprising a frame 26 formed with a forwardly bowed portion 27 and supported on a pair of furrow guide wheels 28. The usual soil engaging elements such as the disks 29 are located rearwardly of the furrow wheels. Each of these cultivator units A, B, C, and D are connected to the transverse member 10 by their respective draft tongues 18, 19, 20, and 21 pivoted at 30, 31, 32, and 33, respectively, to the frames 26 of the lister units A, B, C, and D, respectively, and these cultivator units are similarly pivoted at 22, 23, 24, and 25, respectively, to the transverse member 10. The forwardly bowed portion 27 of the cultivator units is respectively pivoted at 34 to the rest of the cultivator frame to provide flexibility. As each of the cultivator units A, B, C, and D are similar, like references will denote similar parts. These cultivator units may be of the type disclosed in the patent to Olson 1,967,321 granted July 24, 1934. The soil engaging elements 29 have various adjustments for adjusting the angle of cut of the disk. The draw-links 35 for the standards of the furrow guide wheels are adjustably connected at their forward ends to brackets 36 secured to the arched portion 27 of the cultivator frames 26. Rear supporting members 37 are secured to the rear ends of the cultivator frames 26. A transversely extending stiffening member 38 is secured to the members 37 by the clamp member. The wheels for the standards for the cultivator units are secured to the transverse member 39 by the usual clamp brackets. Adjustably mounted on the rear portions of the bracket members 37 is a transversely extending rockshaft 40. Adjusting brackets 41 are adjustably mounted laterally on the rockshaft 40. The shovel arms 42 are pivotally mounted for horizontal movement on the adjusting brackets 41 and are adjusted by means of serrated washers and the arcuate bracket 41 in the usual manner. Secured to the shovel arms are the shovel arm brackets in which the shanks of the cultivator shovels 43 are adjustably mounted. The rearwardly extending supports 44 are pivoted to the supporting bracket 37 in the usual manner and are held in adjusted position by the arcuate adjusting member 45 which is a continuation of the supporting bracket 37. The disks 29 and their disk arms complete with the disk bearings are adjustably mounted for vertical movement on the supporting member 44 and are adjustably secured thereto, as at 46. The disk arms are adjusted horizontally also by the connection at 46. The disk supporting members 44 are arcuately adjusted in horizontal position by means of the arcuate adjusting member 45 by the usual serrated clamping means. In order to adjust the cultivator shovels 43, a quadrant member 47 is secured to the supporting bracket 48 secured to the transverse member 38. A lifting lever 49 is pivoted to the quadrant 47 and is held in adjusted position by the usual detent and teeth. A lifting link 50 is pivotally connected to the lever 49 and to a crank arm 40ª secured to the rockshaft 40. The usual spring pressure may be applied to the shovel arms by the usual spring connection 51 on the link 50.

In order to stabilize or hold each cultivator unit A and D, respectively, in horizontal alignment, supporting brackets 52 are secured to each side of the frame 26, as best shown in Figures 1 and 2. The brackets 52 are U-shaped and have upper and lower spaced roller members journaled thereon. On the right hand side of the cultivator unit A are journaled upper and lower spaced roller members 53. These are similar to the spaced roller members 53' mounted on the left side of the cultivator unit D. On the left side of the cultivator unit A are journaled spaced roller members. The lower roller member 54 and the spaced upper roller member 55 are grooved. The roller members 54 and 55 are similar to the members 55' on the right hand side of the frame of the cultivator unit D. Secured to the right and left hand sides of the cultivator frame of the lister units B and C are the supporting brackets 56. Loosely mounted in the supporting brackets 56 on each unit B and C are the transversely extending stabilizing members 57 and 58, respectively. The stabilizing member 57 secured to the unit B extends laterally across the cultivator unit C, but is not attached thereto, to the cultivator unit D to which it is slidably connected by means of the rollers 53' on the left side of the cultivator unit D and to the rollers 55' on the right hand side of the cultivator unit D. Similarly, the transverse member 58 is flexibly supported on the brackets 56 of the cultivator unit C and extends laterally to the left across the cultivator unit B, but is not attached thereto, to the cultivator unit A to which it is slidably connected by the roller member 53 on the right hand side of the cultivator unit A and the roller members 54 and 55 on the left side. It is, therefore, seen that the outer members A and D are supported in a horizontal position by means of the inner cultivator units C and B respectively. Furthermore, the stabilizing connections 57 and 58 permit the relative movement respectively of the units A and C to each other and the units B and D to each other, while at the same time permitting relative movement of each unit A, B, C, and D to each other respectively. Stops 57' and 58' limit the relative movement of the stabilizing members 57 and 58. It is also to be observed that the units will be held in horizontal relationship so that the outer units will not tend to cultivate deeper than the center units and so that the lister cultivator as a whole will tend to follow the rows without one end of the draft member 10 being swung either to the right or to the left depending upon which cultivator is digging deeper, but will remain at right angles to the travel of the tractor. Furthermore, this connection permits each cultivator unit to follow the deviations in each row and yet keep the lister cultivator as a whole in a stable horizontal position. In order to further the stabilizing of the lister cultivator and to permit the units to follow the rows more readily, a draft equalizing mechanism or means for equalizing the position of the line of draft of the cultivator units has been provided for the two inner adjacent cultivator units B and C. Supported on the draft bar 10 at its mid-portion is a rearwardly extending U-shaped supporting member 59, as best shown in Figures 1, 3, 4, and 5. Attached to the transverse portion of the member 59 on the left side is a supporting bracket 60 to which is pivotally attached a bell crank member 61. On the right hand side of the member 59 is attached a similar supporting bracket 60, as best shown in Figure 5. Another bell crank 62 is attached thereto in a manner similar to the bell crank 61 by the stud 62'. Connecting the forwardly and inner extending portion of the bell crank 62 with the rearwardly and inner extending portion of the bell crank 61 is a diagonally extending link 63. Attached to the main draft tongues 19 and 20 of the units B and C are the inner extending, similar supporting brackets 64 to which are connected similar pivot arms 65. The pivot arms 65 are pivotally and adjustably connected to the bell cranks 61 and 62, respectively. The adjusting holes 66 in the pivot arm 65 are used to accommodate the change in spacing of the different plant rows as from 38 to 42 inch spacing. The aforesaid equalizing means or mechanism just described provides means connected to said cultivator units B and C for equalizing the position of the line of draft of said cultivator units about the line of draft of said lister cultivator. The equalizing means just described may also be considered as means for shifting the cultivator units B and C to maintain symmetry with respect to the longitudinal axis of the draft frame or line of draft of the lister cultivator. With the use of this equalizing mechanism, as best shown in Figures 1 and 4, as the cultivator unit B follows the row it is cultivating to the left, the pivot arm 65 will cause the bell crank arm 61 to pivot to the left which in turn because of the link connection 63 to the bell crank 62 will cause the cultivator unit C to swing to the right. Similarly any movement of the cultivator unit B to the right will cause the cultivator unit C to swing to the left. Also any movement of the cultivator unit C to the right will cause the cultivator unit B to move to the left and any movement of the cultivator unit C to the left will cause the cultivator unit B to move to the right. As each cultivator unit B and C is respectively connected by the slidable stabilizing members 57 and 58 to the cultivating units D and A any movement of the cultivator unit B or C will also slightly affect the movements of the cultivator units A and D laterally, and, as the stabilizing members 57 and 58 are supported in a horizontal plane, the cultivator units A and D will be held in a horizontal plane. Stabilizing members 57 and 58 are connected to the outer units D and A, respectively, by the grooved rollers 54' and 55', and 54 and 55. Similarly any movement of the units A or D will cause movements of units B and C. The effect of the equalizing connection between these cultivating units B and C is to cause the summation of the moments of the forces of the earth working implements of the cultivator units B about the center line of draft of the implement to be the same as the summation of the moments of the forces of the cultivator units C about the center line of draft to be equal. The result of this is that the lister cultivator will trail directly behind the tractor at all times and will not tend to swing about the pivot connection of the tractor to the implement. The effect of the equalizing means on the cultivator units B and C may be summed up in these terms that the summation of the moments of the forces of the cultivator unit B about the centre line of draft is equal to the summation of the moments of the forces of the cultivating unit C about the center line of draft. The moments of each cultivator unit may be considered as the product of the forces exerted by each unit and the perpendicular distance of each unit to the centre line of draft. The main purpose of the stabilizing members is to keep the outer sections from tipping to prevent one shovel or disk from running deeper than the other, although permitting the outer units to move in or out independent of the inner units.

The arcuate portions 27 of the cultivator units A, B, C, and D, respectively are secured to their respective draft tongues 18, 19, 20, and 21 by a guide support 67, as best shown in Figure 2. The guide support 67 comprises upper and lower rollers 68 and 69 supported by spaced members 70 between the upper and lower draft tongues 18 and 18'. This construction is similar for each unit. By means of this construction each unit A, B, C, and D may swing relative to the draft tongues 18, 19, 20, and 21 about their respective pivots 30, 31, 32, and 33. The draft tongues 18 and 20 of the cultivator units A and C are longer than the draft tongues 19 and 21 of the cultivator units B and D in order to permit the lateral movement of each cultivator unit to each other and to allow the trash to clear each unit. With the guide supports 67 the lister units A, B, C, and D will follow the movement of the main lister frame formed by the transverse member 10. Any slight movement in a vertical plane of the cultivator units may be had about the pivotal connections 34. In laterally spaced relation to the draft tongues 18, 19, 20, and 21, respectively, each cultivator unit A, B, C, and D is provided with the auxiliary draft links 71, 72, 73, and 74, respectively. Each draft link is adjustably mounted at its forward end on the transverse member by a supporting bracket 75 secured to the transverse member 10 and at its rear end it is pivotally connected to the frame member 26. The lateral adjustment of this auxiliary draft link for different row spacings is provided for by the adjusting holes 76 in the bracket 75. The lateral adjustment of each unit is accomplished by moving the adjusting bracket 22 and changing the position of the auxiliary draft link 71 on the support 75. It is thus seen that a parallel draft link connection is established between each of the cultivator units and the draft members by the pivot points 30 and the pivot points 77 of the cultivator unit A, the pivot points 31 and 77' of the cultivator unit B, and the pivot points 32, and the pivot points 77'' of the cultivator unit C and the pivot point 33 and the pivot points 77''' of the cultivator unit D for the pivotal connections of the parallel draft link connection formed by the draft tongues 18, 19, 20, and 21 and the auxiliary draft links 71, 72, 73, and 74, respectively.

The draft tongues 18, 19, 20, and 21 are pivotally connected at 30, 31, 32, and 33, respectively, by the draft connection 78 which is secured to the transverse frame member 38 of each cultivator unit. Whenever adjustment is necessary for different row widths the parallel auxiliary draft links 71, 72, 73, 74 must be moved in and out accordingly so as to keep the links parallel with their respective draft tongues.

With the connections thus described, it is seen that each cultivator unit A, B, C, and D may freely move horizontally on the transverse stabilizing members 57 and 58 because of the parallel draft connection previously described. Any variance in manufacture or when the hitch connections are worn of the cultivator to the transverse draft member 10, is taken care of by means of the longitudinal slot formed between the rollers 53 and the rollers 54 and 55 and also the flexible connection of the brackets 56. The grooved rollers 54 and 55 are grooved sufficiently to take care of tolerances necessary in the manufacture of the implement. Because of the upper and lower rollers of the cultivator units A and D, the cultivator units A and D are free to move laterally in either direction and likewise cultivator units B and C are free to move laterally in either direction. The above manner of mounting the cultivator units permits the units to have limited lateral movement while at the same time maintaining the units in a stable or upright position at all times.

The soil engaging tools of all these units may be raised and lowered in unison by the movement of the forwardly extending lifting lever 79 which is pivotally mounted to an upwardly and rearwardly extending member 80 secured to the central hitch bar 12. The lever 79 extends to within the reach of the operator on the tractor. The supporting member 80 is securely braced by the member 81 connecting the supporting member 80 to the brace 11ª. At the rear end of the supporting member 80 is secured an adjusting quadrant 82 about which the lifting lever 79 is adjusted and latched in adjusted position by the usual detent. A lifting arm 83 is secured to the lifting lever 79. A pivoted link 84 connects the lifting arm 83 to a rearwardly extending bracket member 85 which is also used to brace the U- shaped support 59. The bracket member 85 is also secured to the transversely extending frame member 10. In order to counterbalance the weight of the cultivator units a counterbalancing spring 86 is connected to a rearward extension 79ª of the lifting lever at its lower end and the spring is adjustably connected at its upper end to a supporting brace 87 secured to the member 89 and acting also as a support for the quadrant 82. It is thus seen that if the front hitch connection of the lister cultivator is secured to the draw-bar 16 that when the lifting lever 79 is pushed downwardly the link 84 is moved downwardly causing the hitch frame and the implement frame to pivot at its axis at 13 causing the implement frame 10 and its attaching parts to swing downwardly and pivot about the axes of the furrow guide wheels 28 of the cultivator units A, B, C, and D, respectively. The axes of the furrow guide wheels 28 of the cultivator units are not in alignment, the axes of the units B and C being in advance of the axes of the others, and whatever movement is necessary relative between the implement frame 10 and the cultivator units may be provided for in the flexible connections of the units. As the cultivator gangs are raised, the front left hand corner of the implement frame 10 drafts a little faster than the right hand corner of the frame and as a result is somewhat lower than the other corner when the gangs are raised for transport. The flexible connections between the stabilizing members 57 and 58 and the cultivator units are also provided to accommodate the laterally swinging actions of the gangs that they may swing from one side to the other. As the forward portion of the implement frame 10 and its connecting parts move downwardly the rear portions of the frame to which the implement tools are connected are raised simultaneously from the ground. Likewise when the lifting lever 79 is raised, the forward portion of the implement frame 10 and its connecting implements will be raised causing the rear portion to move downwardly about the axes of the furrow guide wheels carrying the ground engaging tools therewith into a ground engaging position. As has been previously disclosed, the cultivator shovels 43 may be adjusted separately by means of the adjusting lever 49 and the soil engaging disks 29 may be similarly adjusted by means of the adjusting connections 45 and 46. Also, the shovel arms 42 may be adjusted laterally by means of the adjusting connection 41. Adjusting holes are also provided in the raising link 84 to help regulate the lift of the gangs. When the links are connected in the lower hole, as shown in Figure 2, the amount of lift is decreased, but greater depth is obtained. If the middle or top hole is used, the height of the lift is increased, but less depth can be obtained.

The foregoing structure provides a simple, strong and efficient multiple row lister cultivator in which each unit is capable of independent lateral movement on substantially straight lines without departing from parallel relation to each other and to the direction of travel, the cultivator as a whole being particularly well adapted for free trailing movement and operation behind a tractor without causing any side draft because of the particular equalizing mechanism between the cultivator units.

Modifications in the preferred structure disclosed may be made without departing from the scope of the invention as defined in the following claims.

What is claimed is:

1. A lister cultivator comprising a frame member, a plurality of cultivator units, draft means pivotally connecting said cultivator units to said frame member for movement relative to each other and to the frame member, and means mounted on said frame member and connected to said draft means for equalizing the position of the line of draft of said cultivator units about the line of draft of said lister cultivator.

2. A lister cultivator comprising an implement frame, a plurality of cultivator units connected to said frame for movement relative to each other and to the frame, a draft frame pivotally connected to said implement frame for relative vertical movement, means for adjusting said implement frame and attached cultivator units vertically by adjusting said draft frame relative to said implement frame, and means for equalizing the position of the line of draft of said cultivator units about the line of draft of said lister cultivator.

3. A lister cultivator comprising an implement frame, a plurality of cultivator units, draft means connecting said cultivator units to said implement frame for movement relative to each other and to the implement frame, a draft frame pivotally connected to said implement frame for relative vertical movement, means for adjusting said implement frame and attached cultivator units vertically by adjusting said draft frame relative to said implement frame, and means connected to said draft means for equalizing the position of the line of draft of said cultivator units about the line of draft of said lister cultivator.

4. A lister cultivator comprising a frame member, a plurality of cultivator units, draft means connecting said cultivator units to said frame member for relative vertical movement with respect to each other and to the frame member, means mounted on said frame member and connected to said draft means for equalizing the position of the line of draft of said cultivator units about the line of draft of said lister cultivator, and means connected to said cultivator units for stabilizing them.

5. A lister cultivator comprising an implement frame, two inner cultivator units adjacent the center line of the lister cultivator and additional cultivator units spaced laterally to the aforesaid cultivator units and on opposite sides of the center line of the lister cultivator, means for pivotally connecting all of said cultivator units to said implement frame, and equalizing means for shifting the line of draft of said cultivator units about the center line of the lister cultivator connecting the two inner adjacent cultivator units together.

6. A lister cultivator comprising an implement frame, two inner cultivator units adjacent the center line of the lister cultivator and additional cultivator units spaced laterally to the aforesaid cultivator units and on opposite sides of the center line of the lister cultivator, means for pivotally connecting all of said cultivator units to said implement frame, and means for equalizing the position of the line of draft of two of said cultivator units about the center line of the lister cultivator.

7. A lister cultivator comprising an implement frame, two inner cultivator units adjacent the center line of the lister cultivator and additional cultivator units spaced laterally to the aforesaid cultivator units and on opposite sides of the center line of the lister cultivator, means for pivotally connecting all of said cultivator units to said implement frame, means for equalizing the position of the line of draft of two of the cultivator units about the center line of the lister cultivator, and means for stabilizing all of said cultivator units against tipping.

8. A lister cultivator comprising an implement frame, two inner cultivator units adjacent the center line of the lister cultivator and additional cultivator units spaced laterally to the aforesaid cultivator units and on opposite sides of the center line of the lister cultivator, means for pivotally connecting all of said cultivator units to said implement frame, equalizing means for shifting the line of draft of said inner cultivator units about the center line of the lister cultivator connecting the two inner adjacent cultivator units together, stabilizing means for stabilizing said cultivator units, said stabilizing means comprising transversely extending members attached to the inner cultivator units and extending in opposite directions, and means for attaching said transverse members to said additional cultivator units.

9. A lister cultivator comprising an implement frame, two inner cultivator units adjacent the center line of the lister cultivator and additional cultivator units spaced laterally to the aforesaid cultivator units and on opposite sides of the center line of the lister cultivator, means for pivotally connecting all of said cultivator units to said implement frame, equalizing means for shifting the line of draft of said inner cultivator units about the center line of the lister cultivator connecting the two inner adjacent units together, means for stabilizing said cultivator units, said stabilizing means comprising a plurality of transversely extending members, means for securing one of said transverse members to one of the inner cultivator units, means for securing the other transverse member to the other inner cultivator unit, each of said transverse members extending transversely from the inner cultivator unit it is secured to and across the other inner cultivator unit, and means for connecting each of said transverse stabilizing members to another cultivator unit.

10. A lister cultivator comprising an implement frame, two inner cultivator units adjacent the center line of the lister cultivator and additional cultivator units spaced laterally to the aforesaid cultivator units and on opposite sides of the center line of the lister cultivator, means for pivotally connecting all of said cultivator units to said implement frame for lateral movement, equalizing means for shifting the line of draft of said inner cultivator units about the center line of the lister cultivator connecting the two inner adjacent units together, and means for stabilizing said cultivator units, said stabilizing means comprising a transversely extending member attached to alternate cultivator units.

11. A lister cultivator comprising an implement frame, two inner cultivator units adjacent the center line of the lister cultivator and additional cultivator units spaced laterally to the aforesaid cultivator units and on opposite sides of the center line of the lister cultivator, means for pivotally connecting all of said cultivator units to said implement frame for lateral movement, equalizing means for shifting the line of draft of said inner cultivator units about the center line of the lister cultivator connecting the two inner units together, and a plurality of means for stabilizing said cultivator units, each of said stabilizing means comprising a transversely extending member attached to alternate cultivator units and extending in opposite directions, each transverse member being secured to an adjacent inner cultivator unit and attached to one of the other laterally spaced cultivator units whereby each inner cultivator unit and its attached laterally spaced cultivator unit may have lateral movement relative to each other while said stabilizing member holds the attached units in a horizontal plane.

12. A lister cultivator comprising an implement frame, two inner cultivator units adjacent the center line of the lister cultivator, and additional cultivator units spaced laterally to the aforesaid cultivator units and on opposite sides of the center line of the lister cultivator, means for pivotally connecting all of said cultivator units to said implement frame for lateral movement, means for equalizing the position of the line of draft of some of said cultivator units about the center line of the lister cultivator, said means comprising means connecting the inner units through which movement of one of said inner cultivator units in one direction will cause movement of the other inner cultivator unit in an opposite direction, and stabilizing means connecting each inner cultivator unit on one side of the center line to one of the additional cultivator units on the opposite side of the center line of the lister cultivator whereby each cultivator unit may move relative laterally to each other.

13. A tractor cultivator comprising an implement frame, a draft frame pivoted to said implement frame for relative vertical movement, a plurality of cultivator units attached to said implement frame and having transporting means, ground engaging tools supported on said cultivator units, means for adjusting said draft frame relative to said implement frame by causing said implement frame to pivot about the transporting means of said cultivator units thereby causing the ground engaging tools to be adjusted vertically, means connected to the cultivator units for equalizing the position of the line of draft of the cultivator units about the line of draft of the cultivator, stabilizing means connected to the cultivator units whereby the cultivator units will be kept in a horizontal plane, and means in the connections of said equalizing means and said stabilizing means whereby the cultivator units have relative movement with respect to each other.

14. A lister cultivator comprising a transverse frame, a plurality of cultivator units, draft means connecting the cultivator units to the aforesaid transverse frame permitting relative movement of the cultivator units to each other and to the transverse frame, and equalizing means mounted on the transverse frame and connected to the aforesaid draft means for equalizing the position of the line of draft of each of said units with respect to the other.

15. A lister cultivator comprising a transverse frame, a plurality of cultivator units, draft means connecting each of the cultivator units to the aforesaid transverse frame permitting relative movement of the cultivator units to each other and to the transverse frame, and means mounted on the transverse frame and connected to each of the aforesaid draft means for shifting the position of the draft means of one of the units in a direction opposite to the movement of another of said units an amount equal to the movement of the last mentioned unit.

16. A lister cultivator comprising a transverse frame, a plurality of cultivator units, draft means connecting each of the cultivator units to the aforesaid transverse frame permitting relative movement of the cultivator units to each other and to the transverse frame, and means mounted on the transverse frame and connected to each of the aforesaid draft means for symmetrically shifting the draft means.

17. A lister cultivator comprising a transverse frame, a plurality of cultivator units, draft means connecting each of the cultivator units to the aforesaid transverse frame permitting relative movement of the cultivator units to each other and to the transverse frame, means mounted on the transverse frame and connected to each of the aforesaid draft means for symmetrically shifting the draft means, and means connected to said cultivator units for stabilizing them against tipping.

18. A lister cultivator comprising a transverse frame, a plurality of cultivator units, draft means connecting each of the cultivator units to the aforesaid transverse frame permitting relative movement of the cultivator units to each other and to the transverse frame, a draft frame pivotally connected to said implement frame for relative vertical movement, means for adjusting said implement frame and attached cultivator units vertically by adjusting said draft frame relative to said implement frame, and means mounted on the transverse frame and connected to each of the aforesaid draft means for symmetrically shifting the draft means.

19. A lister cultivator comprising a transverse frame, a plurality of cultivator units, draft means connecting each of the cultivator units to the aforesaid transverse frame permitting relative movement of the cultivator units to each other and to the transverse frame, means for vertically adjusting said cultivator units simultaneously, means mounted on the transverse frame and connected to each of the aforesaid draft means for symmetrically shifting the draft means, and means connected to said cultivator units for stabilizing them against tipping.

20. A lister cultivator comprising a transverse frame, a plurality of cultivator units, draft means connecting each of the cultivator units to the aforesaid transverse frame permitting relative movement of the cultivator units to each other and to the transverse frame, the aforesaid draft means being pivotally connected to the transverse frame and the cultivator units, and means for symmetrically shifting the draft means mounted intermediate the draft means and intermediate the front and rear pivotal connections of each of the draft means to the transverse frame and each of the cultivator units.

21. A lister cultivator comprising a transverse frame, a plurality of cultivator units, draft means connecting each of the cultivator units to the aforesaid transverse frame permitting relative movement of the cultivator units to each other and to the transverse frame, means mounted on the transverse frame and connected to each of the aforesaid draft means for symmetrically shifting the draft means, said last mentioned means comprising a plurality of levers mounted on said transverse frame, means connecting the adjacent ends of said levers, and means connecting the other ends of said levers to the aforesaid draft means whereby a movement of one of said cultivator units in one direction will cause a similar movement of the other cultivator unit in an opposite direction.

WILLIAM S. GRAHAM.